C. B. BOYLE.
PHOTOGRAPHIC LENS.

No. 50,681.  Patented Oct. 31, 1865.

Witnesses:

Inventor:
C. B. Boyle

UNITED STATES PATENT OFFICE.

CHARLES B. BOYLE, OF NEW YORK, N. Y.

IMPROVEMENT IN PHOTOGRAPHIC LENSES.

Specification forming part of Letters Patent No. 50,681, dated October 31, 1865; antedated October 25, 1865.

*To all whom it may concern:*

Be it known that I, CHARLES B. BOYLE, of the city, county, and State of New York, have invented a new and useful Improvement in Photographic Lenses; and I do hereby declare the following to be a full and exact description thereof, reference being had to the accompanying drawings, and the letters of reference marked thereon.

The nature of my invention consists of a modification of the Cornea lens, the application for a patent upon which is now filed in the Patent Office of the United States. It will there be seen that the Cornea lens is constructed of three pieces of glass, which correspond in their optical results to the optical results of the human eye, as therein claimed, explained, and set forth, and of which the accompanying lens is only a slight modification.

I construct the front lens, A, of two pieces of glass, B being crown and C being flint; but this combination is so constructed that the flint-glass C is made to overcorrect the crown-glass B, leaving, therefore, a plus of chromatic dispersion, due to the flint-glass C, or more particularly to that portion of the flint-glass lens C lying between the concave surface D and the dotted line E. Consequently the dispersion of color is outward, or inverse to that of a condensing-lens, and the prismatically-dispersed light passing on from the front lens, A, continues to spread as it recedes from that lens until it meets the positive lens, F, and the chromatic dispersive action of that lens being inverse to the chromatic dispersion of the flint-glass lens C, the dispersion of the lens C is therefore arrested and reversed by the lens F, as shown by the colored lines at the point G, Figure 1, and is thence carried to a focus free from color.

Figure 1:
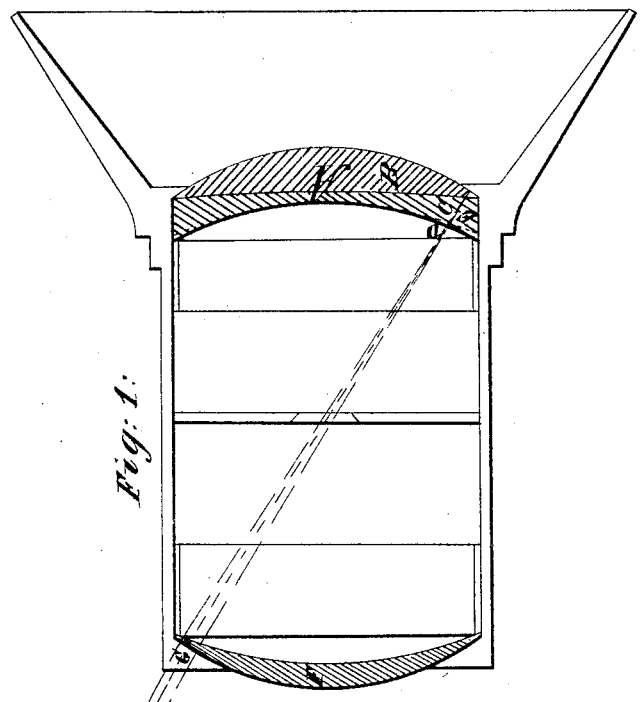
Figure 2:
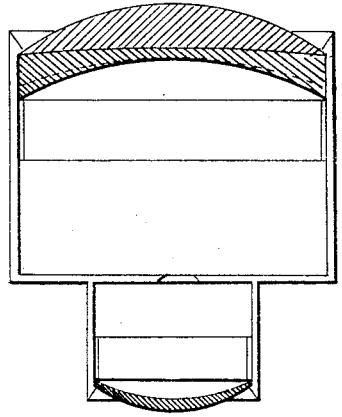

Another peculiarity of this construction of lens is that by the proper management of the relative angular proportions of flint and crown glass the field of the focus may be completely flattened, or, if desired, even bent back convex toward the light, as it will be found that by increasing the angular quantity of the flint-glass lens C by shortening the radius of the back curve D, the focus will be extended toward the extreme edges of the picture until the focal plane will be bent back to any desired extent instead of forward, as it now is by all photographic lenses. In making a calculation for a combination of this nature it will be necessary not only to take into account the angular amount of crown-glass corrected by the angular amount of flint, but also the distance at which the lens F is placed from the lens A, as it is evident that the farther the lens F is placed from the lens A the greater will be the amount of chromatic dispersion suffered by the light, as shown by the divergence of the colored rays from A to F, and therefore the amount of the angle of the lens F will have to be correspondingly increased. This combination, as shown by the drawings, is composed of only three pieces of glass, and may be arranged after the manner of the globe or ratio lens, as represented by Figs. 1 and 2.

It will also be found that a lens of this construction will give a sharper picture, when the lenses are of the same size and focal distance and the opening in the diaphragm of the same diameter, than any double achromatic combination, as the Cornea structure will always give better results than any of the ordinary modes of combining flint and crown glass.

What I claim as my invention, and desire to secure by Letters Patent, is—

1. Constructing a photographic lens of three pieces of glass, as described in the specification and laid down in the drawings.

2. The mode herein described of flattening or bending back the focal plane of the photographic lens by plusing the chromatic dispersion of the flint-glass over that of its associate crown-glass lens.

CHARLES B. BOYLE.

Witnesses:
WM. M. HOES,
L. LADERER.